Aug. 12, 1952 — M. E. EVANS — 2,606,650
CONTINUOUS WIRE DRAWING MACHINE
Filed April 23, 1945 — 2 SHEETS—SHEET 1

INVENTOR
Martin E. Evans

Aug. 12, 1952 M. E. EVANS 2,606,650
CONTINUOUS WIRE DRAWING MACHINE
Filed April 23, 1945 2 SHEETS—SHEET 2
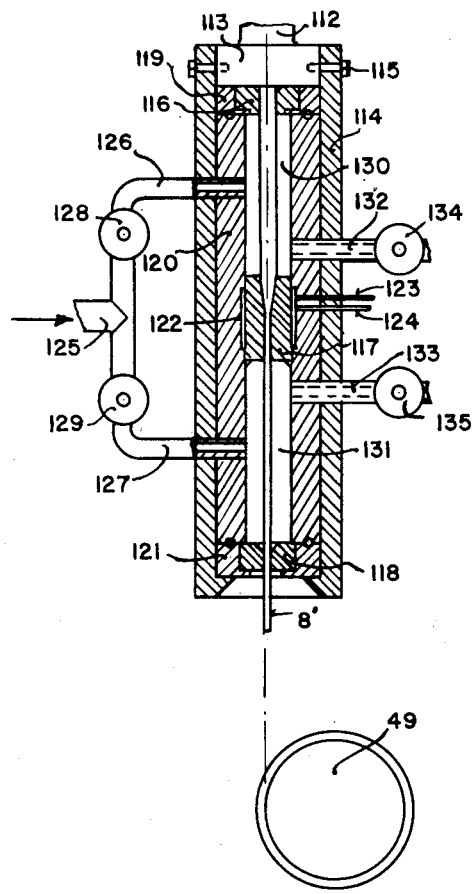
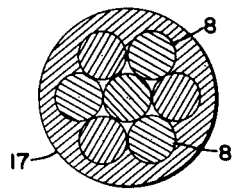
INVENTOR.
Martin E. Evans Patented Aug. 12, 1952

2,606,650

UNITED STATES PATENT OFFICE 2,606,650

CONTINUOUS WIRE DRAWING MACHINE

Martin E. Evans, Brooklyn, N. Y.

Application April 23, 1945, Serial No. 589,758

13 Claims. (Cl. 205—14)

This invention relates to attenuating machinery and particularly to a continuous wire drawing machine for attenuation of material requiring heat for working and for strands of that material in group arrangement.

This invention has for its objects, provision of means for heating the work piece in coils on attenuating machine; for variably accumulating the work pieces in coils while developing heat in or transferring heat to the coiled pieces; for handling the work pieces progressively as a bunch of elements and as individual elements; for removing extraneous material from and shaping the work pieces; for making recalcitrant work pieces submissive to bending; for elimination of furnaces for heating the work pieces; for reducing the handling operations incident to attenuation processing; for separating a plurality of work piece elements jointly attenuated; for restoring physical properties due to attenuation but decreased by heating; for completing a surfacing operation by a final step of attenuation; for reducing the number of required work piece propelling means; and for effecting over all economies of operation.

In the operation of reducing the cross section of metals by drawing through a die, the apparatus used is dependent upon the character of the metal and on the cross-section of the work piece. On the other hand, the character of the apparatus determines the length of the work piece that can be handled, and the resultant costs of operation determine the commercial availability of the metal strip.

In the field of this invention, the agencies assembled in cooperative relationship for attenuating a work piece are chosen for their ability to overcome the reluctance of the piece to bend around a traction drum, to induce submission to elongating and divisional stresses, and to surface condition the piece and modify its physical condition.

As an example of a work piece reluctant to submit to attenuation, reference is made to U. S. Patent 2,326,629 which describes an iron or steel rod for drawing having a surface aluminum alloy, the aluminum not exceeding 17% and preferably 12% or less. The higher aluminum content makes the rod more reluctant to accept bending around a traction drum and to submit to elongation in a die. The availability of heating means in proximity to the traction drum makes continuous attenuation of such a work piece feasible and the attenuated article a commercial product.

Another example of a recalcitrant work piece is made up of iron, copper, or steel wires with zinc or other material molded between and around them to provide a solid cross-section and a smooth contour. The nature of the molded zinc is such that heat is required to effect unbending of the combination from a coil, to facilitate its elongation in attenuating means and to rewind in coils. Provision for mold production of such a work piece is shown in U. S. Patent 2,374,594 of which this is a continuation in part.

In another aspect, the molded work piece is not essential. In the preparation of stainless steel for attenuation, it is customary to provide substantial coverings of lead on the work piece. In this instance then, a plurality of work pieces in divided side by side relationship may be passed through a common die for attenuation by this invention and then separated and treated in accordance with the dictates of suitable practice such as removal of the lead and final attenuation to restore the strength lost by the final heating.

The utilization of heat to assist in attenuation is a well known practice. The heating means heretofore has been in the nature of a furnace, fuel fired with attendant hearths and flues, or of an electric furnace, both requiring lateral space accommodation between attenuations. Both require extra handling of the work piece for threading and cut off the availability, inspection and manipulation where the heat is applied, and limit the speed of operation. In contrast, applicant's invention incorporates the heating means in the machine whereby the handling is for attenuation as usual and the heating is incidental to passage through the machine in coiled shape. The coiled exposure provides a longer length subject to the heat, and accommodates a faster machine operation for a given heat transfer or development in the work piece. The application of heat in the coils in the machine makes submissive to attenuation work piece material that otherwise would need to be initially superheated in order to carry sufficient heat to accommodate unwinding from accumulated coils.

In a continuous wire drawing machine having a series of dies and associated drawing drums and having the work piece propelled through the dies in series by the drums, it is customary for the speed of the work piece to be increased as it becomes smaller in diameter. Accumulators between the dies provide variable storage for the work piece between reductions. Work pieces which require heat to condition them for bending from coil form and reduction in the die, by reason of the time spent on the usual accumulator and the increasing rotational speed lose a portion of this heat. The straight horizontal traverse between dies is too short in point of work piece exposure to replace the lost heat by exposure to a heat source. Exposure of the work piece having an angular line of traverse relative to the die axis provides increased exposure, reaching its maximum where the work piece is coiled. By increasing the accumulated coils between attenuations, increased exposure and heat transfer may be provided. Means to this end are provided by this invention.

In the operation of heating a work piece incident to attenuation, by group heating of the components economy of heating facilities is attained. For example, where it is customary to heat treat between attenuations as part of the continuous operation, and with four attenuating means and a group of seven components in an organized group, four heating means for coils attain the heat transfer for twenty-eight group attenuations. That is, 28 component heat transfers are made by the four heating means with a saving of 24 heating means. The same remarks regarding attenuations apply; with four attenuating means, by the group action they effect 28 reductions in the 7 components of the group. In these cases a further fifth attenuation as a finishing operation may be provided for each of the seven components in continuation from the grouped arrangement. The finishing operation by propelling the work piece through dies, as practiced by this invention, involves a spreading action or separation of the components from group arrangement in some cases; in other cases it may require application of heat in combination with spreading with or without dies. Considering the four group attenuations and the seven finishing attenuations for a group of seven wires, a total of thirty-five attenuations are attained by the foregoing practice or mechanism. Thus, using eleven dies, there is an overall saving of 24 dies, which is a substantial attainment by reason of the organization of the machine used.

In separating wires of a bundle jointly attenuated for a further individual finishing passage through a die, the wires may be divided out for the operation at various points longitudinally of the bundle. In this case, the finishing dies, if such are used, must be disposed longitudinally of the bundle, necessitating the use of separate propelling means at the separating areas. If, however, as provided by this invention, the wires are spread out from a near common point to form a fan or cone, the finishing dies may be disposed in near parallel and laterally positioned relationship, thus facilitating reassembly of the wires from the dies through a common die. Further, this disposition facilitates utilization of a single propelling source for the plurality of wires in the finishing attenuating operation.

In its broad aspect, this invention contemplates the working of a material at a temperature sufficiently high to facilitate the acquisition of flexibility. It is particularly directed to the provision of means for working metal strip and thermoplastic material together in an attenuating operation and into a combined product.

In the manufacture of lamp cord for electric lamps, No. 30 gage B. & S. copper wire .010 inch in diameter is assembled in groups of 16, 26, 41, and 65 wires for sizes 18, 16, 14 and 12 B. & S. gage respectively. In the manufacturing operation, each wire is drawn and spooled separately. The wires are then unspooled, as they are assembled in a group for twisting and covering with insulation. Contrasted with this practice, the present invention employs a grouped arrangement of the requisite numbers, 16, 26, 41, and 65, of copper wires, which after a series of reductions have a final diameter of .010 inch per wire and group sizes of 18, 16, 14 and 12 B. & S. gages respectively. By handling the wires in a group for the product outlined, much scrap and much expensive handling is avoided, fewer dies are required, and production costs are materially lowered. It is obvious that with sixteen wires grouped in a single unit, only one-sixteenth as many operations are required for threading through dies, spooling, respooling, etc., as where the wires are handled individually. The chances of breakage are reduced to a minimum by the group arrangement, and the production per unit of labor is greatly increased.

In the operation of heating an attenuated work piece incidental to further attenuation or finishing, it has been the past practice to apply heat by special handling of the work piece. The special handling involves in one case the placement of the coiled work piece within a furnace on a revolving support with one end of the coil revolving in the furnace and the other leading to an attenuating device. In another case, the spacing of the attenuating mechanism is increased to accommodate a furnace chamber in between for a straight length of the work piece. In the latter case, the time of exposure to heating means is limited to the time of travel of a unit length of work piece from one end to the other of the furnace, which in turn limits the rate of travel through subsequent operations. This invention provides means for retaining the advantages of coil heating, elimination of the unit spacing mentioned, elimination of special handling, and provides for simultaneous heating of a plurality of work pieces and their individual finishing progressively in an attenuating mechanism.

With successive drafts the work piece increases in length, in surface area, in speed of rotation, factors which tend to dissipate the body's heat. To augment the heat developed by attenuation in the first die sufficiently to facilitate attenuation in the next die arcuate heating means are supplied inside the coiled work piece as it is moved in the axial direction of the drum.

Referring to the drawing, Fig. 1 shows a view of the machine in elevation and partial section.

Fig. 3 shows a cross-section of a work piece.

Fig. 4 shows a sectional view of an attenuating device for use in the machine of Figs. 1 and 2.

Figure 1:
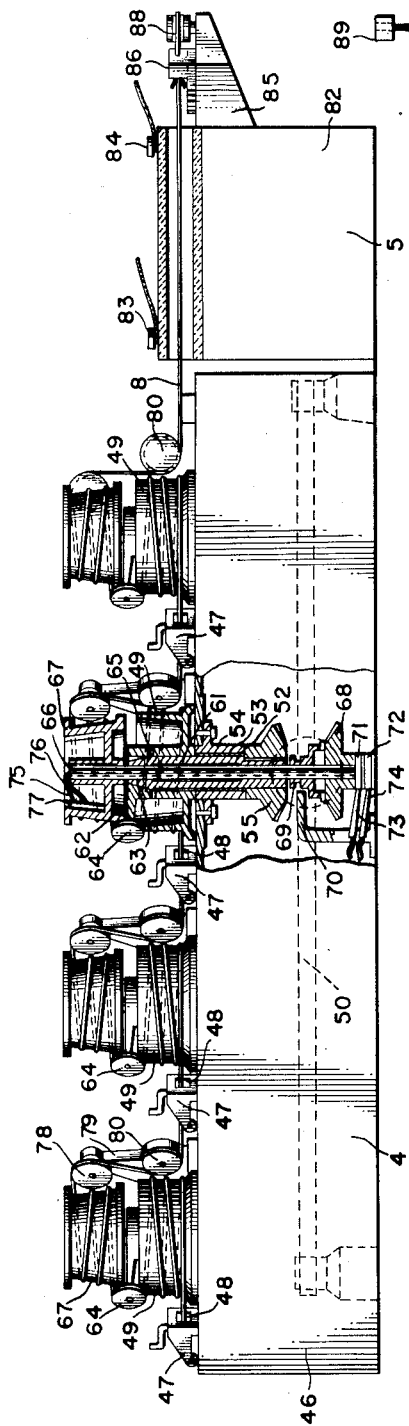
Figure 2:
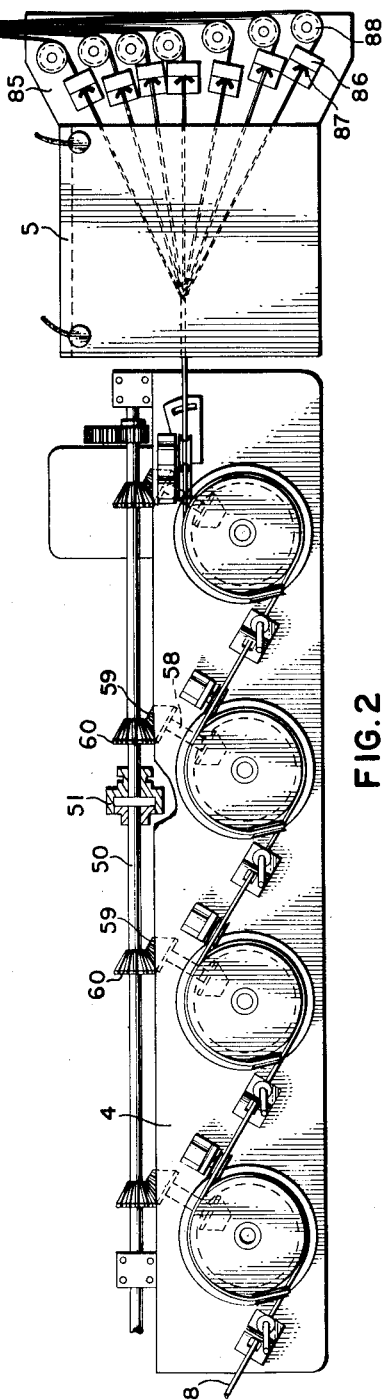
Fig. 2 shows a plan view of Fig. 1.

Referring to Figs. 1 and 2 the drawing machine comprises two base units 4 and 5. In the unit 4 a boxlike frame 46 supports die holders 47 with dies 48 therein, drawing drums 49, and a drive shaft 50 with intermediate gearing between the drive shaft and drums whereby the drums are rotated. A clutch 51 in the drive shaft between drum drives permits selective operation of drawing drums. The hub 61 of each drum 49 is keyed or otherwise secured to a hollow vertical shaft 52, the latter projecting upwardly through the box frame 46 and being suitably journalled in a bushing 53 by a bearing bracket 54 secured to the under side of the box top. At its lower end the shaft carries secured thereto a beveled gear 55 which is in mesh with a beveled pinion 56 that derives rotation through shaft 58 and beveled gears 59 and 60 from shaft 50. For the drawing of wire continuously additional mechanism is required to effect the passage of the wire from block to block, or drum to drum.

The shaft 52 of each block or drum has an extension 63 above the drawing drum 49 having thereon and frictionally driven thereby an arm 62 projecting beyond the periphery of the drum 49 carrying a rotatively mounted guide wheel 64. The arm 62 has a tapered bearing on the shaft 52 which is adjusted in position by ring 65 whereby to regulate the frictional engagement between the arm and the shaft. In the hollow shaft 52 is positioned a spindle 66 which carries on its upper end a drum 67 keyed or otherwise fastened thereto and on its lower end a beveled gear 68 loosely mounted thereon, and intermediate to the bevel gear 55 on the hollow shaft 52 and the loosely mounted gear 68 a friction clutch 69 keyed to the spindle and adapted by its engagement with the gear 68 to transmit motion to the upper drum 67. The lower gear 68 is driven by the same pinion 56 but in the opposite direction as the gear 55 on the upright shaft 52. Movement of the clutch 69 by a lever not shown to the disengaging position throws the clutch against a projecting stationary arm 70 with sufficient force to hold the disengaged spindle from free rotation thereby providing a brake to the drum 67. In the spindle 66 is embedded an electrical cable having at its lower end terminals on a pair of slip rings 71 and 72 in engagement with terminal brushes 73 and 74 respectively mounted on the frame 46 and providing current to the rotating cable. The upper end terminals 75 and 76 of the cable are attached to a heating coil 77 within the upper drum 67 serving to heat said upper drum in accordance with operating requirements. Adjacent to the upper drum 67 and positioned to receive wire tangentially therefrom is a guide wheel 78 on a standard 79 carrying a second guide 80 positioned to guide wire from the upper wheel on its passage to a die 48 or to a succeeding operation.

In operation the periphery of each drum receives enough coils of wire to provide the traction required for drawing the wire through the preceding die. Each drawing drum and its upper associated drum serve as variable storage drums for the wire in process of being drawn. The wire leaving the drawing drum is passed up and on the guide wheel 64 and then around the periphery of the upper drum in the reverse direction to the rotation of the drawing drum 49. Normally the guide wheel 64 through frictional connection rotates with the drawing drum 49, but is restrained by the wire in its reverse passage to the upper drum so that in effect the guide wheel transfers wire from the lower to the upper drum. The wire crowding upwardly on the upper drum there accumulates and is withdrawn therefrom by the drum's rotation with regard to the operation of the drawing drum 49.

The two drums constitute a variable accumulaing device between drafts on a wire and consequently the gear ratios of the successive drawing drums in a series need not be so closely determined as is normally the practice in other machines.

The drawing unit 5 comprises a hollow base 82 supporting directly thereon an electrically heated channel 81 and endwise thereof a troughlike bracket 85. Terminals 83 and 84 supply electric current to the channel 81. Bracket 85 carries wipes 87 and dies 86. Take-up means not shown provide traction for the work piece or pieces through the channel 81 and through the wipes 87 and dies 86.

The work piece from the last guide of the drawing unit 4 passes through the chamber 81, electrically heated if desired. If the piece is unitary, it may be directed to any one of the wipes and dies 87 and 86. If the piece is compound, the ends of the elements may be passed through the dies to suitable traction members not shown. Embedded wires pass from the guide 80 through the channel 81 and in consequence of heat therein gradually drop the embedding material to the channel bottom. If the embedding material is metal such as zinc, the melting temperature of zinc being 787° F., a ready flow temperature of 1000° F. may be assumed possible. Taking this temperature as a top working point and consulting a table of physical constants of metallic elements and compounds including plastics, the variety of materials to be utilized in the attenuating machine appears formidable. Current through the terminals 83 and 84 may be regulated by means not shown to accord with the temperature requirements for flow of the embedding material.

While the general term "electrically heated channel or coil" is used, the purpose is to convey the idea of utilizing electricity or electromotive force for heating the work piece in its traverse of various locations in its course through the machine. The medium for development of heat in the work piece is optional and dependent upon the character of the work piece. There is the choice of resistance heating, induction heating and dielectric heating, which are intended to be broadly included in the term. The same remarks may apply to the utilization of electricity with heating coil 77. Associated electrical devices may be housed in the base 4.

Referring to Fig. 3, a plurality of wires 8 are shown enveloped by a material 17' of a nature in keeping with the practice to be followed in the terminal operation of the attenuating mechanism. As previously noted 17' may be lead, mentioned in the capacity of assisting to attenuate stainless steel by keeping the latter from contact with the attenuating die. It may be tin or zinc which in addition to their capacity for attenuation serve involuntarily as a coating medium. The coating action is by reason of their capacity to alloy with the work piece materials such as iron, steel and copper. Further, the material 17' may be a plastic resin in which case heating is essential to induce the cohesive plastic flow with the metal components of the work piece. This material can be sundered by the spreading arrangement of the guides 88 of Fig. 2 over which the component wires are directed. Passage of the sundered material with the foundation components through dies 86 may serve to shape up the components and accompanying material on their way to the die 89. The practice followed is dictated by the nature of the work piece, and the mechanism of this invention is adapted to diverse practices by variation of the path of the work piece, temperature regulation, and die assemblies.

Referring to Fig. 4, details of an attenuating device are shown in partial section. For plastic materials that tend to depart from the work piece during an attenuating operation this device is preferably substituted for plain dies 48 of Fig. 1 on supports not shown in that figure, but represented by member 113 of Fig. 4. On support 113, adapted to passage of a work piece a housing 114 carries a number of dies 116, 117 and 118 in sections 119, 120 and 121 respectively. The sections are coaxially positioned to afford a path for the work piece 8 to the drawing drum 49. Die 117 is provided with an electric heating coil 122 which may be of either the induction or the resistance type with terminals 123 and 124. A pipe 125 with branches 126 and 127 and valves 128 and 129 supply chambers 130 and 131 around the work pipe 8 with suitable fluid for purposes later disclosed. From the chambers extend pipes 132 and 133 with valves 134 and 135.

Referring to Fig. 4, the combination work piece entering die 117 is compressed in chamber 130 by liquid under pressure entering from conduit 126. The liquid pressure assures the joint entry of the strands into the die 117. In a similar way liquid under pressure entering chamber 131 from conduit 127 compresses the attenuated combination work piece so that the resin can not depart from the metal strand. Regulation of valves 134 and 135 allows a restricted flow of the liquid from the chambers thereby effecting a cooling of the work piece while maintaining the lateral pressures. Heating coil 122 around die 117 provides for temperature conditioning of the die. The combined heating action by the coil 122 and the cooling action by liquid flow through valves 134 and 135 provide an operating temperature range for the die whereby recalcitrant materials may be jointly attenuated with softer materials.

Again referring to Fig. 4, and considering a work piece therein of separate wires and plastic there around and between, as the wire and plastic emerge at die 116 the plastic tends to travel faster than the wire and therefore liquid under pressure in chamber 130 is provided to limit the plastic divergence from uniform cross section and to assure its proportionate entrance to die 117 where plastic and wire are reduced proportionately in cross section. Liquid in chamber 131 functions to hold the plastic in place.

The arrangement in Fig. 4 may be further used at various points in the operations. Reference is made to Figs. 1 and 2 and particularly to the right hand end of the figures where the wires are fanned out to the dies 86 and guides 88. It is noted that the dies 86 are spaced as closely together as their dimensions will admit and that space occupied by section 5 is only that required to position the dies 86 and guides 88 side by side. To supply the dies 86 with strands fanned out from guide 80 only utilizes the top space of section 5 which is required to support the dies in their laterally positioned relationship. The locus of the diverging point of the wires extending from guide 80 to the guides 88 will vary with the character and size of the wires and their condition. The convergence of the wires from guides 88 to the converging member 89 positions the wires for direction to a common means of propulsion, preferably a capstan. The utilization of a channel around the fanned out wires with heating means entails consumption of little or no additional space. Referring to section 4 and the capstans thereon and the spacing of the dies and capstans, it is to be noted that each die has its capstan whereas the other end of the machine with the plurality of dies requires but one capstan for the work piece in its divided condition. It is understood that the dies on section 4 are relatively large to accommodate a plurality of strands operating as a unit while the dies on section 5 are relatively smaller and accommodate the component strands. The work piece in dies 48 may have the components joined as a unit during passage and sundered into separate components by the spreading action of guides 88 with or without the aid of heat, as required. The continuous operation of the machine propelling the compound work piece through a plurality of dies positioned longitudinally relative to each other and then through a plurality of dies positioned laterally relative to their axes is broadly new and effects economies in handling of the work piece, and economy in the use of dies and blocks, and with the incorporation of heating means within the space limitations prescribed by the machine provides new products.

The new disposition of dies, capstans, power connections and mountings, including within their space limits two types of heating means provides a novel attenuating machine. The cooperative simultaneous action of its parts on a bundle of strands effects their attenuation by the use of fewer mechanical parts and with reduced handling.

I claim:

1. A wire drawing machine comprising, a frame, a rotatable shaft mounted on said frame, a drawing drum mounted on said shaft, a driving connection between said shaft and drum, a die for attenuating the material, said material extending to said drawing drum and therearound in coils moved progressively axially of said drum and extending to a successive operating means; heating means within said coiled material; a supply source for the medium providing heat in said heating means; and a connection to said source accommodating rotary movement of said heating means with said coils; whereby said heat treatment is effected in the normal space encompassed by said coiled material on said machine.

2. In a wire drawing machine for a plurality of wires, wire supply means comprising a rotatable drum adapted to wind coils thereon of a bundled plurality of wires, said drum being situated to discharge said bundle to a first locus from which said wires are divergent; means to heat said bundled wires coiled on said drum from the interior thereof; a supply source of heating medium for said heating means; a connection to said supply source accommodating rotary motion; a plurality of rotary guides mounted in lateral relationship positioned to divert said strands laterally from said first locus; means to converge said strands from said rotary guides to a second locus into a bundle for propulsion by a single traction means; dies on said diverted strands; and a single traction means to propel said strands through said dies whereby heating, supply and propulsion means are reduced.

3. In an attenuating machine for a plurality of strands grouped as a composite strand, a die and capstan unit for drawing said composite strand and thereby rough drawing the individual strands, and means to heat treat composite strand in its arcuate form initiated by said capstan, whereby a plurality of individual strands are drawn and heat treated within the normal operating path of a single strand.

4. In an attenuating machine for a plurality of strands grouped as a composite strand, an advance heater for said composite strand whereby individual strands of said composite are jointly conditioned for reception of treatment by said machine, a die and a capstan unit for drawing said composite strand after being heated by said heater, and means associated with said capstan to heat treat said composite strand in its arcuate form initiated by said capstan whereby a plurality of individual strands are drawn and heat treated within the normal operating path of a single strand.

5. In an attenuating machine for a plurality of strands, a plurality of dies mounted in lateral relationship; converging means for assembling said strands from said dies on their exit sides in a common locus as a bundle for propulsion through said dies by a single traction means and a single traction means for said bundle or composite strand, whereby plural traction means becomes unnecessary for attenuation of said plurality of strands by said dies.

6. In an attenuating machine for a plurality of strands, a rotary support supplying said strands to a first locus as a bundle or composite strand, a succeeding plurality of die and capstan units for drawing said composite strand and thereby rough drawing the individual strands, a succeeding plurality of rotary guides mounted in lateral relationship to divert said strands from the last die and capstan unit, individual finishing dies for each diverted strand; means to converge said strands from said plurality of individual dies to a second common locus into a bundle for propulsion, and a single traction means for said bundle, whereby a single source supplies said strands and a single traction means is enabled to propel said strands.

7. In an attenuating machine for a plurality of strands, a rotatable drum adapted to wind into coils thereon a bundled plurality of strands and discharge said bundle or composite strand to a first locus, a plurality of rotary guides mounted in lateral relationship positioned to divert said strands from said locus; dies for said individual strands; means to converge said strands from said rotary guides to a second common locus into a bundle or composite strand, whereby a single source supplies said strands thereby obviating handling of said strands singly in the supply area; and a single traction means to propel said strands through said dies.

8. In a continuous wire drawing machine for simultaneous attenuation of a plurality of wires, a relatively large die adapted to attenuate said wires in a bundle; a plurality of smaller dies to which wires are diverted from said attenuated bundle extending from said larger die; means to guide said diverted wires axially of said smaller dies; converging means for said wires from said smaller dies, whereby said wires are reassembled in a bundle; and means to draw said bundle to pull said wires through said smaller dies, said reassembled bundled arrangement of said wire effecting a material saving in the traction means required for propelling said wires through said dies.

9. In a continuous wire drawing machine for simultaneous attenuation of a plurality of wires, a relatively large die adapted to attenuate said wires in a bundle; a plurality of smaller dies to which wires are diverted from said attenuated bundle extending from said larger die; means to guide said diverted wires axially of said smaller dies; converging means for said wires from said smaller dies, whereby said wires are reassembled in a bundle; heating means intermediate said large die and said plurality of dies adapted to render said wires submissive to bending; and means to draw said bundle to pull said wires through said smaller dies, said bundled arrangement of wires effecting a material saving in the number of traction means for propelling said wires.

10. In an attenuating machine for a plurality plurality of strands, a rotary support supplying said strands to a first locus as a bundle or composite strand, a succeeding plurality of die and capstan units for drawing said composite strand and thereby rough drawing the individual strands, a succeeding plurality of rotary guides mounted in lateral relationship to divert said strands from the last die and capstan unit, individual finishing dies for each diverted strand, and means to draw said individual strands through said individual finishing dies.

11. In an attenuating machine for a plurality of strands grouped as a composite strand, a succeeding plurality of attenuating and capstan units for attenuating said composite strand and thereby rough attenuating the individual strands of the composite, a succeeding plurality of guides mounted in lateral relationship to divert said strands from said composite after leaving the last attenuating capstan unit, individual surface finishing means for each individual diverted strand, and means to draw said individual strands through said individual finishing means.

12. In an attenuating machine for a plurality of strands grouped as a composite, a progressive plurality of die and capstan units for drawing said composite strand and thereby rough drawing the individual strands of the composite, a succeeding plurality of guides mounted in lateral relationship to divert said strands from the last die and capstan, individual finishing means for each diverted strand of the composite; means to converge said strands from said plurality of finishing means to a second common locus and again into a composite for propulsion, and a single traction means for said composite, whereby a single traction means is enabled to propel said finished strands.

13. In an attenuating machine, strand supply means comprising a rotatable drum adapted to wind into coils thereon said strand and situated to discharge said strand to an attenuating device; means to heat said strand while being coiled on said drum, a source of electromotive force; a connection to said source to supply electromotive force to said heating means; a reducing die for said strand; a chambered mounting for said die; a gland for said strand in said chamber in alignment with said die; fluid under flow pressure in said chamber to treat said work piece; heating means for said die; a connection to said source to supply electromotive force to said die heater; whereby the temperature of said strand is regulated preparatory to and during passage through said machine.

MARTIN E. EVANS.

REFERENCES CITED

The following references are of record in the file of this patent:

UNITED STATES PATENTS

| Number | Name | Date |
| --- | --- | --- |
| 275,859 | Robertson | Apr. 17, 1883 |
| 310,995 | Farmer | Jan. 20, 1885 |
| 443,536 | Norman | Dec. 20, 1890 |
| 1,034,643 | Patterson | Aug. 6, 1912 |
| 1,043,089 | Gibbs | Nov. 5, 1912 |

(Other references on following page)

UNITED STATES PATENTS

| Number | Name | Date |
|---|---|---|
| 1,233,807 | Read | July 17, 1917 |
| 1,266,349 | Timmis | May 14, 1918 |
| 1,292,659 | Speed | Jan. 28, 1919 |
| 1,341,986 | Keyes | June 1, 1920 |
| 1,409,452 | Johnson | Mar. 14, 1922 |
| 1,666,928 | Evans | Apr. 24, 1928 |
| 1,712,348 | Howe | May 7, 1929 |
| 1,741,056 | Honig | Dec. 24, 1929 |
| 1,896,613 | Fowle | Feb. 7, 1933 |
| 1,904,147 | Larsen | Apr. 18, 1933 |
| 1,968,903 | Norton | Aug. 7, 1934 |
| 1,980,363 | Staples | Nov. 13, 1934 |
| 2,011,398 | Dimick | Aug. 13, 1935 |
| 2,019,555 | Wood | Nov. 5, 1935 |
| 2,023,364 | Crapo | Dec. 3, 1935 |
| 2,040,343 | Simons et al. | May 12, 1936 |
| 2,048,450 | Horn | July 21, 1936 |
| 2,050,298 | Everett | Aug. 11, 1936 |
| 2,077,682 | Everett | Apr. 20, 1937 |
| 2,148,469 | Hudson | Feb. 28, 1939 |
| 2,197,524 | Green | Apr. 16, 1940 |
| 2,215,477 | Pipkin | Sept. 24, 1940 |
| 2,262,716 | Wolfer | Nov. 11, 1941 |
| 2,308,638 | Balthis et al. | Jan. 19, 1943 |
| 2,370,973 | Lang | Mar. 6, 1945 |
| 2,374,594 | Evans | Apr. 24, 1945 |
| 2,409,539 | Brown | Oct. 15, 1946 |
| 2,438,956 | Warner | Apr. 6, 1948 |

FOREIGN PATENTS

| Number | Country | Date |
|---|---|---|
| 563,941 | France | Oct. 6, 1923 |
| 415,359 | Great Britain | Aug. 23, 1934 |